United States Patent

Katsumata

[19]

[11] Patent Number: 5,844,637

[45] Date of Patent: Dec. 1, 1998

[54] PROJECTION APPARATUS WITH A POLARIZER, GLASS PANEL, AND QUARTER-WAVEPLATE AT LIGHT EXIT SIDE OF LIQUID CRYSTAL

[75] Inventor: Masao Katsumata, Tokyo, Japan

[73] Assignee: Sony Corporation, Tokyo, Japan

[21] Appl. No.: 810,376

[22] Filed: Mar. 3, 1997

[30] Foreign Application Priority Data

Mar. 5, 1996 [JP] Japan ................................. 8-047643

[51] Int. Cl.⁶ .............................................. G02F 1/1335
[52] U.S. Cl. ................................ 349/8; 349/98; 349/117
[58] Field of Search .................... 349/117, 8, 98

[56] References Cited

U.S. PATENT DOCUMENTS

| | | | |
|---|---|---|---|
| 3,942,872 | 3/1976 | Saeva | 349/98 |
| 4,025,161 | 5/1977 | LaRoche | 349/98 |
| 5,157,523 | 10/1992 | Yamagishi et al. | 349/8 |
| 5,371,617 | 12/1994 | Mitsutake et al. | 349/10 |
| 5,532,852 | 7/1996 | Kalmanash | 349/98 |
| 5,570,215 | 10/1996 | Omae et al. | 349/117 |

FOREIGN PATENT DOCUMENTS 6-160836   6/1994   Japan .......................................... 349/8

*Primary Examiner*—Anita Pellman Gross
*Attorney, Agent, or Firm*—Jay H. Maioli

[57] ABSTRACT

A semiconductor device can be prevented from malfunctioning by interrupting reflected beam. Polarizing plates (1), (3) are disposed at beam entrance and exit sides, respectively of a transmission liquid-crystal display device (2) as polarizers. Beam from the polarizing plate (3) has the change of light and shade presented in accordance with a video signal. An optical isolator using a quarter-wave plate (4) is disposed at the beam exit side of the polarizing plate (3). A glass panel (5) such as an optical filter is disposed at the beam exit side of the quarter-wave plate (4), whereby beam from the polarizing plate (3) is converted into linearly-polarized beam having an arbitrary plane of polarization. When this linearly-polarized beam is introduced into the optical isolator using the quarter-wave plate (4), inputted linearly-polarized beam is converted into circularly-polarized beam by action of the quarter-wave plate (4). The thus converted circularly-polarized beam is irradiated on the glass panel (5).

6 Claims, 2 Drawing Sheets

PROJECTION APPARATUS WITH A POLARIZER, GLASS PANEL, AND QUARTER-WAVEPLATE AT LIGHT EXIT SIDE OF LIQUID CRYSTAL

BACKGROUND OF THE INVENTION

The present invention relates to an optical device for use with a liquid-crystal projector in forming beams for displaying an image, for example.

Heretofore, there has been commercially available a projector apparatus for displaying a video signal or the like by projecting display beams formed by a transmission liquid-crystal display device onto a screen.

FIG. 1 of the accompanying drawings shows an optical apparatus using a transmission liquid-crystal display device for use with such projector.

As shown in FIG. 1, there is provided a transmission display device 42 which includes polarizing plates 41, 43 provided at its beam entrance side and exit side, respectively as polarizers. Incident beam from an arbitrary light source (not shown) is introduced through the polarizing plate 41 into the liquid-crystal display device 42, and the liquid-crystal display device 42 changes the plane of polarization of the beam passing therethrough in accordance with video signals (not shown) inputted separately.

Beam with the thus changed plane of polarization is introduced into the polarizing plate 43. Therefore, the intensity of the light beam from the polarizing plate 43 is changed in accordance with the change of the plane of polarization so that light and shade are changed in accordance with the inputted video signal. Then, when this beam is projected onto a screen (not shown), for example, an image is displayed on the screen in accordance with the inputted video signals.

A semiconductor device disposed within the liquid-crystal display device 42 is adapted to switch video signals. When beam with high intensity irradiates the liquid-crystal display device 42, a voltage is generated in a channel or the like of the semiconductor device. There is then the risk that the semiconductor device will mal-function due to the voltage thus generated. On the other hand, a transmittance of the liquid-crystal display device 42 may be so low that irradiation of beam with high intensity is indispensable to the liquid-crystal display device 42 in order to form a projector, for example.

To obviate the aforesaid shortcoming, when the liquid-crystal display device 42 is manufactured, a shielding mask (i.e. black matrix (=BM)) is formed on each semiconductor device at its side which beam from a light source irradiates. According to this arrangement, incident beam from the light-source is shielded by the mask and therefore can be prevented from being irradiated on each semiconductor device. Therefore, there is then no risk that each semiconductor device will malfunction due to incident beam.

However, in the above-mentioned optical device, a glass panel 44 such as an optical filter is disposed on the liquid-crystal display device 42 at its side from which display beam is emitted. In that case, there is then the risk a part of beam from the polarizing plate 43 will be reflected on the glass panel 44 so that reflected-back beam will be returned to the exit side of the liquid-crystal display device 42.

To solve the aforesaid problem, there has been proposed a method of suppressing intensity of reflected beam by lowering reflectivity at the interface with an antireflection coating applied to the glass panel 44 at its side opposing the liquid-crystal display device 42.

However, even when the glass panel 44 is coated with the antireflection coating as described above, reflectivity on the interface cannot be reduced to 0% and there exists a very small reflected beam. When the projector irradiates the liquid-crystal display device 42 with beam of high intensity, if the glass panel 44 has a very small reflectivity of about 10%, then there is generated intensity of reflected beam under which some influence such as mal-functioning is exerted upon the semiconductor device. As a result, a displayed image or the like is affected.

On the other hand, in order to mask the reflected beam from the glass panel 44, it has been proposed that a shield mask (i.e. black matrix (=BM)) similar to that of the entrance side is also disposed on the beam exit side of each semiconductor device of the liquid-crystal display device 42.

When the structure of the liquid-crystal display device 42 is realized, the number of processes for manufacturing optical devices increases, and hence the optical devices become expensive. Moreover, to compensate the displacement between the positions of the masks provided on the beam entrance side and the exit side of each semiconductor device, a range in which each mask functions has to be expanded. There is then the problem that an aperture ratio at which beam passes through the liquid-crystal display device 42 is lowered.

SUMMARY OF THE INVENTION

In view of the aforesaid aspect, it is an object of the present invention to provide an optical device in which a semiconductor device disposed within a liquid-crystal display device can be prevented from mal-functioning by a simple arrangement, thereby making it possible to avoid a displayed image from being affected.

It is another object of the present invention to provide an optical device in which a semiconductor device disposed within a liquid-crystal display device can be satisfactorily prevented from mal-functioning by a simple arrangement without increasing a manufacturing cost and without lowering an aperture ratio.

According to an aspect of the present invention, there is provided an optical device which is comprised of a liquid-crystal panel into which beam is introduced, a polarizing plate disposed on the liquid-crystal panel at its side from which beam is emitted, a glass panel disposed on the polarizing plate at its side from which beam is emitted, and a quarter-wave plate disposed between the polarizing plate and the glass panel.

According to another aspect of the present invention, there is provided a liquid-crystal projector which is comprised of a first liquid-crystal display device including a first liquid-crystal panel into which beam of first color is introduced and a first pair of polarizing plates disposed ahead of and behind the first liquid-crystal panel, a second liquid-crystal display device including a second liquid-crystal panel into which beam of second color is introduced and a second pair of polarizing plates disposed ahead of and behind the second liquid-crystal panel, a third liquid-crystal display device including a third liquid-crystal panel into which beam of third color is introduced and a third pair of polarizing plates disposed ahead of and behind the third liquid-crystal panel, a first dichroic mirror disposed at the output side of the first liquid-crystal display device for passing beam of first color and reflecting beams of second and third colors, a second dichroic mirror disposed at the output side of the second liquid-crystal display device for passing beam of the second color and reflecting beams of first and third colors, a third dichroic mirror disposed at the output side of the third liquid-crystal display device for passing beam of third color and reflecting beams of first and second colors, a prism for combining beams of first, second and third colors passed through the first, second and third dichroic mirrors, a lens for projecting combined beam emitted from the prism, and first, second and third quarter-wave plates disposed on the first, second and third pairs of polarizing plates, respectively at their sides from which beams are emitted.

According to a further aspect of the present invention, there is provided a liquid-crystal projector which is comprised of a first liquid-crystal display device including a first liquid-crystal panel into which beam of first color is introduced and a first pair of polarizing plates disposed ahead of and behind the first liquid-crystal panel, a second liquid-crystal display device including a second liquid-crystal panel into which beam of second color is introduced and a second pair of polarizing plates disposed ahead of and behind the second liquid-crystal panel, a third liquid-crystal display device including a third liquid-crystal panel into which beam of third color is introduced and a third pair of polarizing plates disposed ahead of and behind the third liquid-crystal panel, a first color filter disposed at the output side of the first liquid-crystal display device for passing beam of first color, a second color filter disposed at the output side of the second liquid-crystal display device for passing beam of second color, a dichroic mirror disposed at the output side of the third liquid-crystal display device for passing beam of third color and reflecting beams of first and second colors, a prism for combining beams of first, second and third colors passed through the first and second color filters and the dichroic mirror, a lens for projecting combined beam emitted from the prism, and quarter-wave plates disposed on the third pair of polarizing plates at their sides from which beams are emitted.

DETAILED DESCRIPTION OF THE PREFERRED EMBODIMENTS

The present invention will be described below with reference to the drawings. According to the present invention, there is provided an optical device for forming polarized display beam in which an optical isolator using a quarter-wave plate is disposed between a polarizer at its side from which display beam is emitted and an interface for reflection.

Figure 1:
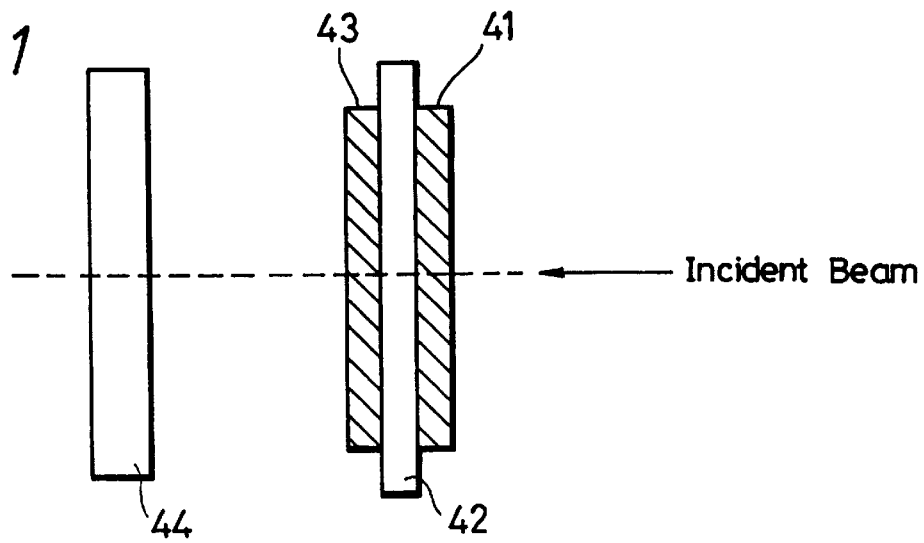
FIG. 1 is a block diagram schematically showing an optical device.
Figure 2:
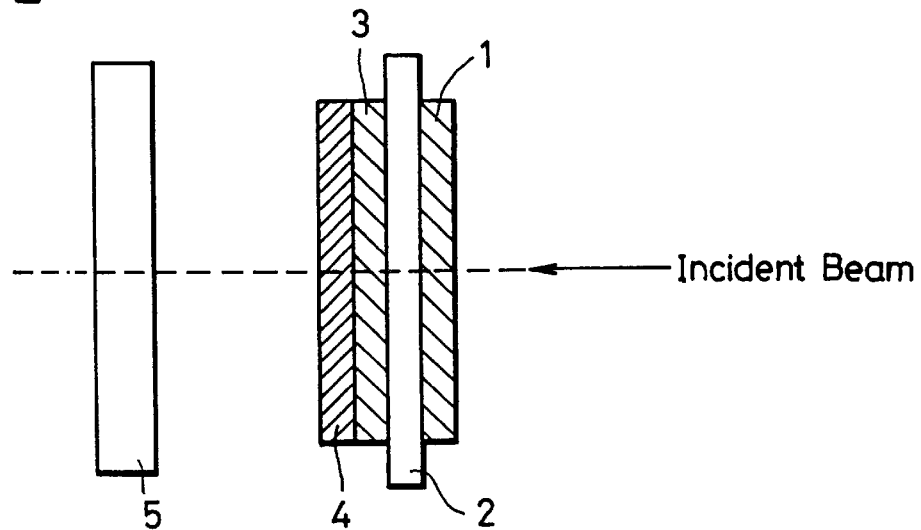
FIG. 2 is a block diagram schematically showing a part of an example of a liquid-crystal projector to which an optical device according to the present invention is applied.

As shown in FIG. 2, there is provided a transmission liquid-crystal display device 2 which includes polarizing plates 1, 3 provided at its beam entrance side and beam exit side, respectively as polarizers. Incident beam from an arbitrary light source (not shown) is introduced through the polarizing plate 1 into the liquid-crystal display device 2, and the liquid-crystal display device 2 changes a plane of polarization of beam traveled therethrough in accordance with separately-inputted video signals (not shown).

Beam whose plane of polarization was changed is introduced into the polarizing plate 3. Accordingly, beam from this polarizing plate 3 is changed in interosity in accordance with the change of the plane of polarization, whereby the change of light and shade is formed in accordance with the inputted video signal.

Further, in this optical device, an optical isolator using a quarter-wave ($\lambda/4$) plate 4 is disposed on the exit side of the polarizing plate 3. A glass panel 5 such as an optical filter is disposed on the beam exit side of the quarter-wave plate 4. Thus, beam from the polarizing plate 3 is introduced into the quarter-wave plate 4 and beam from the quarter-wave plate 4 is emitted through the glass panel 5.

Beam from the polarizing plate 3 is a linearly-polarized beam with an arbitrary plane of polarization. When linearly-polarized beam is introduced into the optical isolator using the quarter-wave plate 4, the thus introduced linearly-polarized beam is converted into circularly-polarized beam. Further, the thus converted circularly-polarized beam is irradiated on the above-mentioned glass panel 5.

In this case, the glass panel passes 90% of irradiated beam and reflects 10% of beam, for example. However, the plane of polarization of reflected beam is rotated ½-wavelength (i.e. $\lambda/2$) by the reflection of circularly-polarized beam. Therefore, when reflected beam from the glass panel 5 is introduced into the quarter-wave plate 4 again, its plane of polarization is rotated $\lambda/2$ before it is returned to the form of a linearly-polarized beam.

As a consequence, the plane of polarization of beam returned to the polarizing plate 3 after it has been reflected by the glass panel 5 is rotated $\lambda/2$ with respect to the plane of polarization of the polarizing plate 3 from which beam was emitted first. Then, since beam whose plane of polarization was rotated $\lambda/2$ is interrupted in this polarizing plate 3, reflected beam from the glass panel 5 is interrupted by the polarizing plate 3 and therefore reflected beam can be prevented from irradiating the liquid-crystal display device 2.

Accordingly, in this optical device, if an optical isolator using a quarter-wave plate is disposed between the polarizer 3 on the beam exit side and the interface for reflection (i.e. glass panel 5), then reflected beam from the interface for reflection can be interrupted by the simplified arrangement. Thus, semiconductor devices disposed within the liquid-crystal display device 2, for example, can be prevented from mal-functioning and thereby eliminate a bad influence exerted upon a displayed image.

Moreover, this optical device does not require such special treatment on the beam exit side of the liquid-crystal display device 2. Therefore, there is then no problem that a manufacturing cost is increased and that an aperture ratio is lowered unlike the case when the shielding mask is disposed on the beam exit side of the liquid-crystal display device 2. Therefore, it is possible, by this simple arrangement to prevent semiconductor devices disposed within the liquid-crystal display device 2 from malfunctioning.

As described above, according to the above-mentioned optical device, there is provided an optical device for forming polarized display beam in which the optical isolator using the quarter-wave plate is disposed between the polarizer at the display beam exit side and the interface for reflection. Thus, reflected beam from the interface for reflection can be interrupted by the simple arrangement, and the semiconductor devices disposed within the liquid-crystal display device can be prevented from mal-functioning, thereby eliminating a bad influence exerted upon a displayed image.

In the optical device, beam emitted from the glass panel 5 is circularly-polarized. However, projectors or the like that are designed in accordance with beam emitted from the polarizer 3 are frequently requested to emit linearly-polarized beam. Specifically, when beam is combined by suitable means such as a prism, projectors are designed so as to obtain optimum characteristics for linearly-polarized beam.

Figure 3:
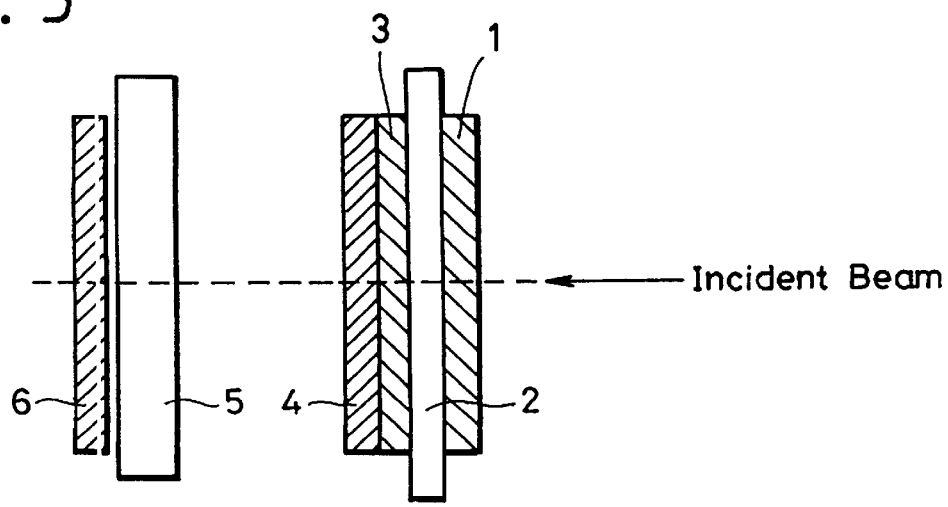
FIG. 3 is a block diagram schematically showing a part of another example of a liquid-crystal projector to which an optical device according to the present invention is applied.

Accordingly, when optical devices are requested to emit linearly-polarized beam, there can be used an optical device shown in FIG. 3. In FIG. 3, elements and parts identical to those of FIG. 2 are marked with the same references and therefore need not be described in detail.

As shown in FIG. 3, a second optical isolator using a quarter-wave plate ($\lambda/4$) 6 or the like is disposed at the beam exit side of the glass panel 5, whereby polarized beam emitted from the quarter-wave plate 6 can be converted from circularly-polarized beam into linearly-polarized beam. In this case, the quarter-wave plate 6 is disposed in such a manner that characteristics of the quarter-wave plate 6 become opposite to those of the quarter-wave plate 4.

Specifically, in the above-mentioned optical device, the quarter-wave plates 4, 6 are formed by stretching mica or polymer plate. In this case, phase characteristics of these quarter-wave plates 4, 6 are oriented to a certain direction so that, when the phase is changed by $+\lambda/4$ with respect to beam introduced from the negative direction, for example, the phase is changed by $-\lambda/4$ with respect to beam introduced from the reverse direction.

Accordingly, when the quarter-wave plate 6 is disposed such that the quarter-wave plates 4, 6 may have opposite phase characteristics, beam introduced into the quarter-wave plate 4 is converted into circularly-polarized beam, whereafter it is reconverted into linearly-polarized beam by the quarter-wave plate 6. The plane of polarization of reconverted beam becomes coincident with the plane of polarization of beam introduced into the quarter-wave plate 4. A plane of polarization of beam passed through the glass panel 5 is not influenced.

Thus, when this optical device includes the quarter-wave plates 4, 6, beam whose plane of polarization is equal to that of beam from the polarizer 3, for example, is emitted from the quarter-wave plate 6. Therefore, without changing the design of the projector which is designed such that beam emitted from the polarizer 3, for example, is used as it is, this optical device can be used more easily than the conventional optical device.

Figure 4:
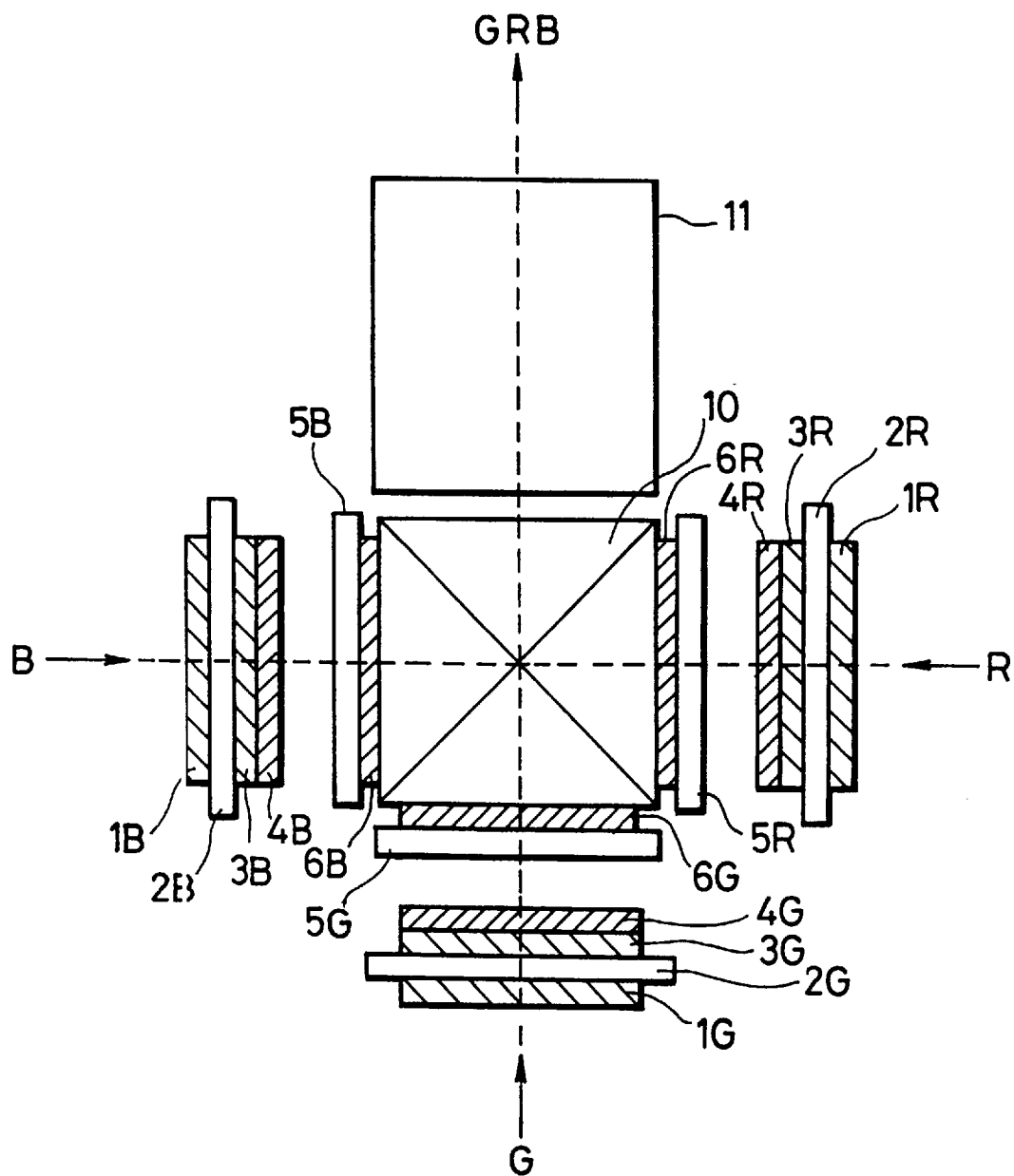
FIG. 4 is a block diagram schematically showing a part of a further example of a liquid-crystal projector to which an optical device according to the present invention is applied.

FIG. 4 shows an optical device in which beams of three primary color video signals, for example, are combined and then emitted. In FIG. 4, like parts corresponding to those of FIG. 3 are marked with the same references.

As shown in FIG. 4, this optical device includes a color prism 10 and a projection lens 11 disposed at the beam exit side from which combined beam of the prism 10 is emitted. Beam of green (G) becomes incident on the prism 10 at its first incident portion opposing the projection lens 11, and this incident beam is introduced into a liquid-crystal display device 2G to which a green (G) video signal (not shown) is inputted through a polarizing plate 1G which is similarly arranged to that of the above-mentioned optical device.

This liquid-crystal display device 2G changes a plane of polarization of beam passed therethrough in accordance with the inputted green (G) video signal. Beam with a changed plane of polarization is introduced into a polarizing plate 3G, and beam with light and shade changed in accordance with the green (G) video signal is emitted from the polarizing plate 3G. An optical isolator using a quarter-wave plate ($\lambda/4$) 4G is disposed at the beam exit side of the polarizing plate 3G.

The quarter-wave plate 4G has on its beam exit side disposed a color filter such as a dichroic mirror (DM) 5G for reflecting beams of red (R) and blue (B). Further, beam emitted from the dichroic mirror (DM) 5G is introduced into a second quarter-wave plate ($\lambda/4$) 6G. Beam from the quarter-wave plate 6G is introduced into the first incident portion of the prism 10.

Beam of red (R), for example, is introduced into the prism 10 at its second incident portion perpendicular to the first incident portion. This incident beam is introduced into a liquid-crystal display device 2R to which a red (R) video signal (not shown) is inputted through a polarizing plate 1R arranged similarly to that of the above-described optical device.

This liquid-crystal display device 2R changes a plane of polarization of beam passed in accordance with the inputted red (R) video signal. The beam with a changed plane of polarization is introduced into a polarizing plate 3R, and beam with light and shade changed in accordance with the red (R) video signal is emitted from this polarizing plate 3R. Further, an optical isolator using a quarter-wave plate ($\lambda/4$) 4R or the like is disposed at the beam exit side of the polarizing plate 3R.

The quarter-wave plate 4R has on its beam exit side disposed a dichroic mirror (DM) 5R for reflecting beams of green (G) and blue (B). Further, beam emitted from the dichroic mirror (DM) 5R is introduced into a second quarter-wave plate 6R. Then, beam from the quarter-wave plate 6R is introduced into the second incident portion of the prism 10.

Beam of blue (B), for example, is introduced into the prism 10 at its third incident portion perpendicular to the first incident portion. Then, this incident beam is introduced into the liquid-crystal display device 2B arranged similarly to the above-mentioned optical device and, to which a blue (B) video signal (not shown) is inputted through the polarizing plate 1B.

This liquid-crystal display device 2B changes a plane of polarization of beam passed in accordance with the inputted blue (B) video signal. Beam with a changed plane of polarization is introduced into the polarizing plate 3B, and a beam with light and shade changed in accordance with the blue (B) video signal is emitted from this polarizing plate 3B. An optical isolator using a quarter-wave plate ($\lambda/4$) 4B is disposed in the polarizing plate 3B at its side from which beam is emitted.

The quarter-wave plate 4B has on its beam exit side disposed a color filter such as a dichroic mirror (DM) 5B for reflecting beams of red (R) and green (G). Further, beam from the dichroic mirror (DM) 5B is introduced into a second quarter-wave plate ($\lambda/4$) 6B, and beam from the quarter-wave plate 6B is introduced into the third incident portion of the prism 10.

Further, this prism 10 synthesizes beams whose light and shade were changed in accordance with the green (G), red (R) and blue (B) video signals. Then, the thus combined beam is projected through the projection lens 11 disposed at the beam exit side of the prism 10 onto a screen (not shown), whereby a color image is displayed on the screen in accordance with the inputted video signals of three primary colors.

According to the above-mentioned optical device, when beams from a plurality of liquid-crystal display devices are introduced through filter means to the prism and thereby combined, if the optical isolator using the quarter-wave plate is disposed between at least one polarizer and filter means, reflected beam can be interrupted by the simple arrangement and the semiconductor device disposed within the liquid-crystal display device can be prevented from mal-functioning. Thus, a bad influence exerted upon a displayed image can be eliminated.

In the optical device shown in FIG. 4, the color prism 10 which assumes linearly-polarized beam as an incident beam is caused to have different characteristics depending upon s-wave and p-wave of a plane of polarization of linearly-polarized incident beam. In that case, the planes of polarization of beams introduced into the prism 10 can be made coincident with the planes of polarization of beams emitted from the polarizing plates 3G, 3R and 3B as described above.

Therefore, each optical device attached to the prism 10 can use the optical device shown in FIG. 4 instead of the conventional optical device. When the synthetic prism 10 does not assume linearly-polarized beam as an incident beam, the second quarter-wave plates 6G, 6R, 6B are not always required but the optical device can be prevented from mal-functioning by the quarter-wave plates 4G, 4R and 4B.

Further, in the optical device shown in FIG. 4, beams of green (G) and red (R) are relatively high in luminance and are not easily affected by other beams. However, beam of blue (B) is low in luminance and is apt to be affected by beam of green (G), for example. Accordingly, the color filters of green (G) and red (R) may be formed of ordinary color-absorption filters instead of the dichroic mirrors (DM) 5G, 5R.

For this reason, it is frequently observed that only the blue (B) color filter is formed of the dichroic mirror (DM) 5B. In that case, although reflectivity of the ordinary color-absorption filter can be lowered, reflectivity of dichroic mirror (DM) cannot be lowered, and only the above-mentioned blue optical device may include the quarter-wave plates 4B, 6B.

According to the present invention, since the optical isolator using the quarter-wave plate is disposed between the polarizer at the beam exit side and the interface for reflection, reflected beam from the interface for reflection can be interrupted by the simple arrangement, whereby the semiconductor devices provided within the liquid-crystal display device can be prevented from mal-functioning. Thus, a bad influence that is to be exerted upon a displayed image can be eliminated.

Therefore, the beam exit side of the liquid-crystal display device need not be treated by any special means, and hence a manufacturing cost can be prevented from increasing and the aperture ratio can be prevented from being lowered unlike the case when the shielding mask is disposed at the beam exit side of the liquid-crystal display device. Thus, it is possible, with the simple arrangement to satisfactorily prevent the semiconductor device disposed within the liquid-crystal display device from malfunctioning.

Further, when this optical device includes the quarter-wave plates, beam whose plane of polarization is equal to that of beam from the polarizer, for example, is emitted from the quarter-wave plate. Therefore, without changing the design of the projector which is designed such that beam emitted from the polarizer, for example, is used as it is, this optical device can be used more easily than the conventional optical device.

Furthermore, according to the present invention, when beams from a plurality of liquid-crystal display devices are introduced through filter means to the prism and thereby combined, if the optical isolator using the quarter-wave plate is disposed between at least one polarizer and filter means, reflected beam can be interrupted by the simple arrangement and the semiconductor device disposed within the liquid-crystal display device can be prevented from mal-functioning. Thus, a bad influence exerted upon a displayed image can be eliminated.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical device comprising:

a liquid-crystal panel into which a beam is introduced;

a polarizing plate disposed on said liquid-crystal panel at a side of said liquid-crystal panel from which said beam is emitted;

a glass panel disposed on said polarizing plate at a side of said polarizing plate from which said beam is emitted; and a quarter-wave plate disposed between said polarizing plate and said glass panel, wherein said glass panel includes a second quarter-wave plate disposed at a side of said glass panel from which said beam is emitted.

2. An optical device comprising:

a plurality of polarizing plates for polarizing a plurality of beams;

a plurality of optical filters into which said plurality of beams polarized by said plurality of polarizing plates are introduced;

a prism for combining said beams emitted from said plurality of optical filters; and at least one quarter-wave plate disposed between each of said plurality of polarizing plates and a corresponding one of said plurality of optical filters, wherein said plurality of optical filters and said prism include at least a plurality of second quarter-wave plates, each disposed between one of said plurality of optical filters and said prism.

3. The liquid-crystal projector comprising:

a first liquid-crystal display device including a first liquid-crystal panel into which a beam of a first color is introduced and a first pair of polarizing plates disposed at a beam input side and a beam output side, respectively, of said first liquid-crystal panel;

a second liquid-crystal display device including a second liquid-crystal panel into which a beam of a second color is introduced and a second pair of polarizing plates disposed at a beam input side and a beam output side, respectively, of said second liquid-crystal panel;

a third liquid-crystal display device including a third liquid-crystal panel into which a beam of a third color is introduced and a third pair of polarizing plates disposed at a beam input side and a beam output side, respectively, of said third liquid-crystal panel;

a first dichroic mirror disposed at said beam output side of said first liquid-crystal display device for passing said beam of said first color and reflecting said beams of said second and third colors;

a second dichroic mirror disposed at said beam output side of said second liquid-crystal display device for passing said beam of said second color and reflecting said beams of said first and third colors;

a third dichroic mirror disposed at said beam output side of said third liquid-crystal display device for passing said beam of said third color and reflecting said beams of said first and second colors;

a prism for combining said beams of said first, second and third colors Passed through said first, second and third dichroic mirrors, respectively;

a lens for projecting a combined beam emitted from said prism; and first, second and third quarter-wave plates respectively disposed on beam output side polarizing plates of said first, second and third pairs of polarizing plates, wherein said first, second and third dichroic mirrors and said prism include fourth, fifth and sixth quarter-wave plates disposed between said prism and said first, second and third dichroic mirrors, respectively.

4. The liquid-crystal projector as claimed in claim 3, wherein said first color, said second color and said third color are red, green and blue, respectively.

5. A liquid-crystal projector comprising:

a first liquid-crystal display device including a first liquid-crystal Panel into which a beam of a first color is introduced and a first pair of polarizing elates disposed at a beam input side and a beam output side, respectively, of said first liquid-crystal panel;

a second liquid-crystal display device including a second liquid-crystal panel into which a beam of a second color is introduced and a second pair of polarizing plates disposed at a beam input side and a beam output side, respectively, of said second liquid-crystal panel;

a third liquid-crystal display device including a third liquid-crystal panel into which a beam of a third color is introduced and a third pair of polarizing plates disposed at a beam input side and a beam output side, respectively, of said third liquid-crystal panel;

a first color filter disposed at said beam output side of said first liquid-crystal display device for passing said beam of said first color;

a second color filter disposed at said beam output side of said second liquid-crystal display device for passing said beam of said second color;

a dichroic mirror disposed at said beam output side of said third liquid-crystal display device for passing said beam of said third color and reflecting said beams of said first and second colors;

a prism for combining said beams of said first, second and third colors passed through said first and second color filters and said dichroic mirror;

a lens for projecting a combined beam emitted from said prism; and quarter-wave plates disposed on the beam output side polarizing plate of said third pair of polarizing plates at the side of said third beam output side polarizing plate from which said beam of said third color is emitted, wherein said dichroic mirror and said prism include a second quarter-wave plate disposed between said dichroic mirror and said prism.

6. The liquid-crystal projector as claimed in claim 5, wherein said first, second and third colors are red, green and blue, respectively.

* * * * *